Oct. 6, 1953   H. C. SHAGALOFF ET AL   2,654,229
CONTROL FOR ABSORPTION REFRIGERATION SYSTEMS
Filed June 30, 1951                                       2 Sheets-Sheet 2
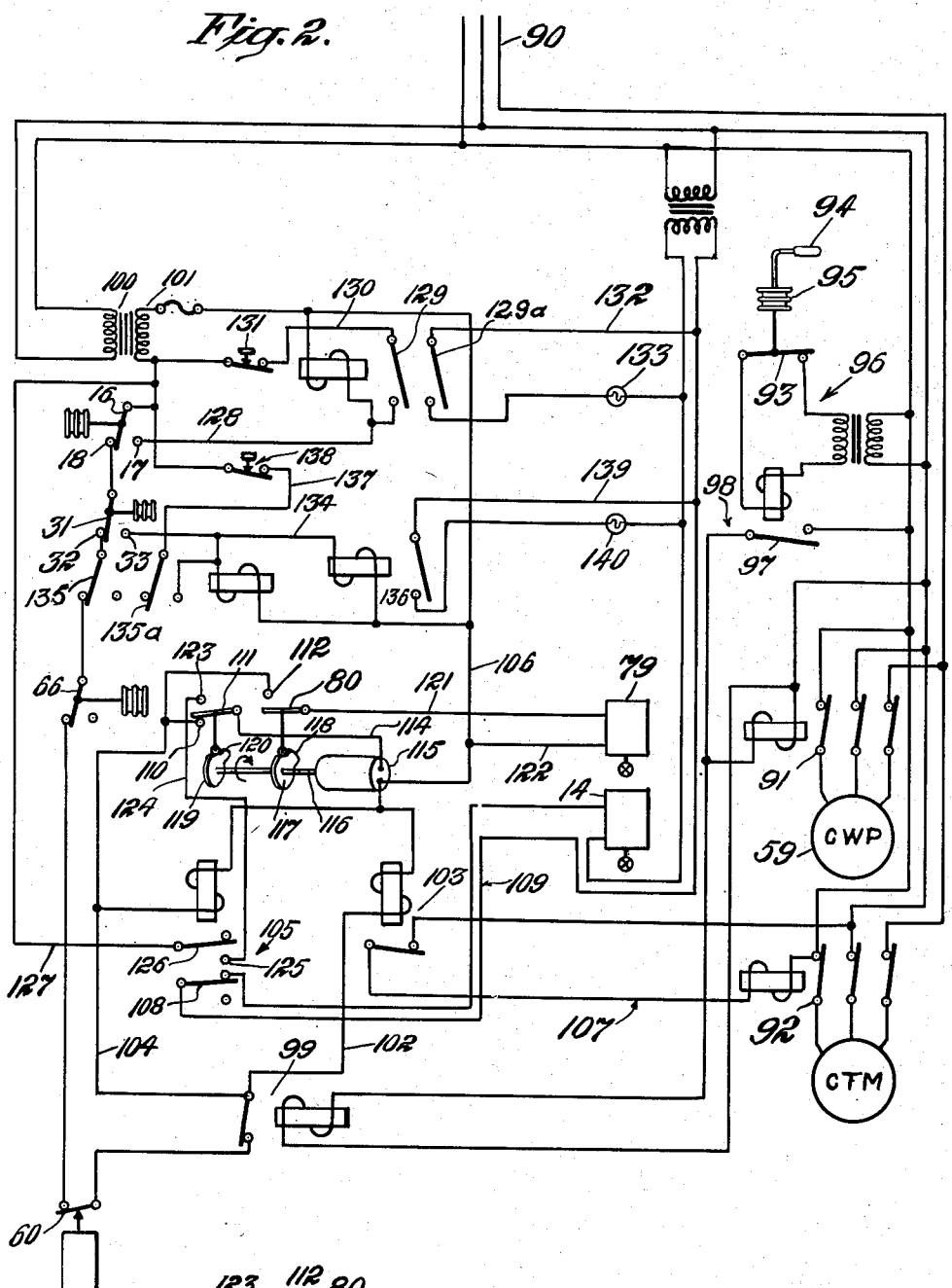
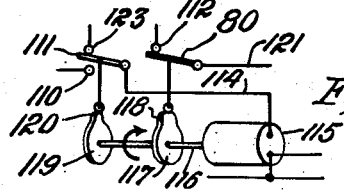
INVENTORS
Harry C. Shagaloff
and Philip A. Cooper
By Oliver S. Titcomb
their ATTORNEY Patented Oct. 6, 1953

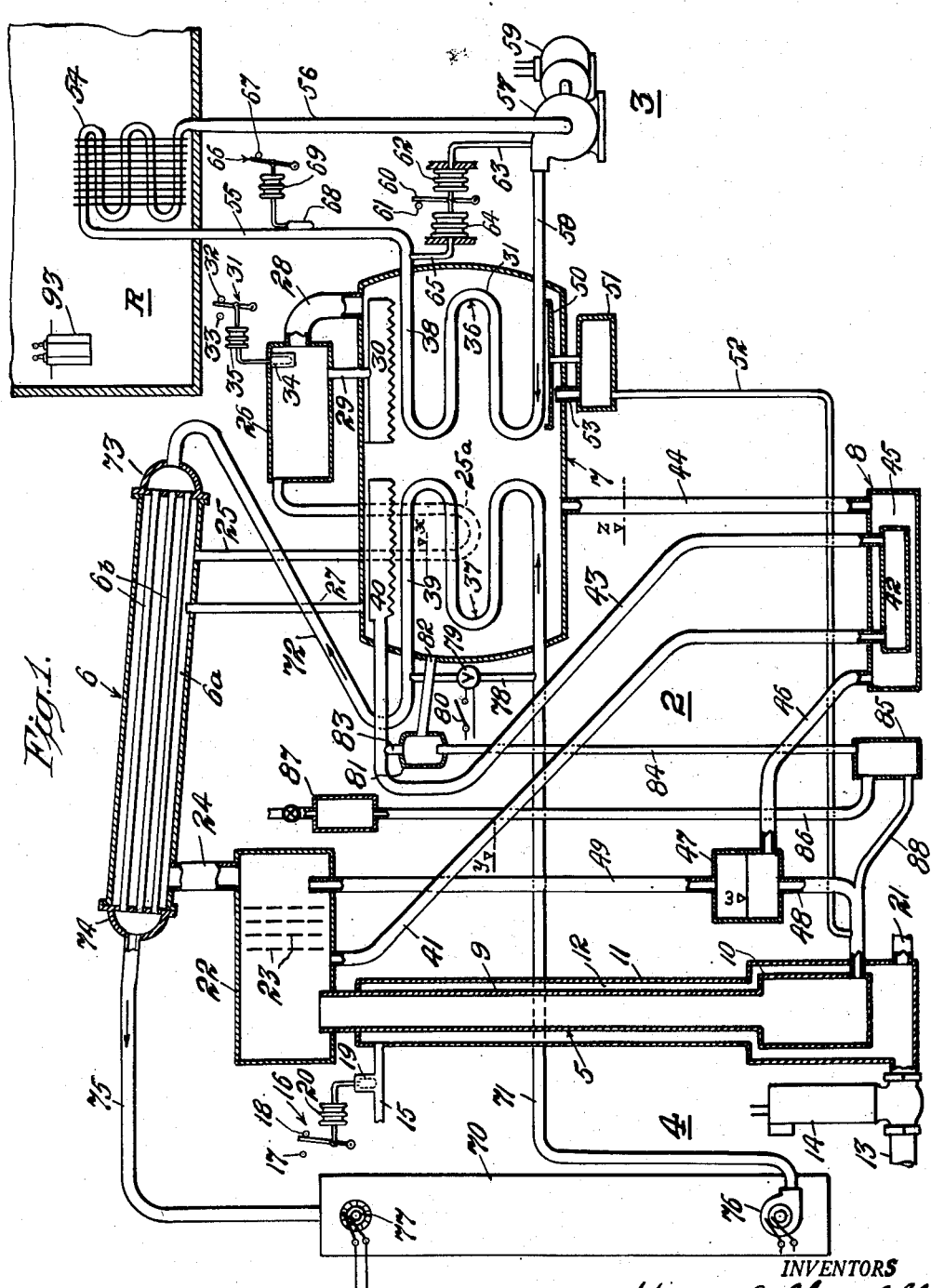

2,654,229

UNITED STATES PATENT OFFICE 2,654,229

CONTROL FOR ABSORPTION REFRIGERATION SYSTEMS

Harry C. Shagaloff and Philip A. Cooper, Evansville, Ind., assignors to Servel, Inc., New York, N. Y., a corporation of Delaware Application June 30, 1951, Serial No. 234,522

15 Claims. (Cl. 62—5)

1

The present invention relates to air conditioning and more particularly to a control arrangement for an air conditioner.

The vacuum type absorption refrigeration system described and claimed in United States Letters Patent to Albert R. Thomas et al. 2,282,503 issued May 12, 1942, has been extensively used for air conditioning. Such a system utilizes a refrigerant such as water and an absorbent such as a salt solution and is adapted to cool air to a comfortable temperature. The evaporator or cooling element of the system comprises a plurality of substantially horizontal tubes arranged one over the other and refrigerant flows through the interior of the tubes by gravity while the air to be cooled flows over the exterior of the tubes and between heat transfer fins mounted thereon.

When such a vacuum type absorption refrigeration system of large capacity is used for air conditioning, the evaporator and air ducts become excessively large. This difficulty can be overcome by providing an auxiliary cooling system for circulating a secondary refrigerant in heat exchange relation with the evaporator and air to be cooled. However, with a vacuum type system of large capacity additional precautions must be taken to prevent the refrigerant, such as water, from freezing in the evaporator.

One of the objects of the present invention is to provide an air conditioner having an auxiliary cooling system in heat exchange relation with a primary refrigeration system and air to be cooled and a control arrangement responsive to different conditions which would produce an excessively low temperature in the primary refrigeration system.

Another object is to provide a control for an air conditioner of the type indicated which automatically controls its operation in accordance with requirements and prevents operation of the primary refrigeration system until secondary refrigerant is circulating in the auxiliary cooling system to load the evaporator.

Another object is to provide a control of the type indicated for controlling the circulation of the secondary refrigerant in response to changes in the temperature of the ambient to be cooled and controlling operation of the primary refrigerant system in response to changes in the temperature of the secondary refrigerant so long as the latter is being circulated to load the evaporator.

Another object is to provide a vacuum type absorption refrigeration system having an absorber which is cooled and an arrangement including a timing control to delay cooling the absorber until sufficient refrigerant has been supplied to fully load the system.

Another object is to provide a control arrangement which prevents operation of the refrigeration system and gives a warning if the refrigeration system does not utilize all of the heat supplied or if the temperature of the evaporator is too low.

These and other objects will become more apparent from the following description and drawings in which like reference characters denote like parts throughout the several views. It is to be expressly understood, however, that the drawings are for the purpose of illustration only and not a definition of the limitation of the invention, reference being had for this purpose to the appended claims. In the drawings:

Fig. 1 is a diagrammatic view of an air conditioner having a primary vacuum type absorption refrigeration system incorporating the control elements of the present invention;

Fig. 2 is a wiring diagram of the electric control circuit for the air conditioner illustrated in Fig. 1; and Fig. 3 is a detailed view of the timer for delaying the cooling of the absorber and showing the arrangement of the control switches to close the by-pass valve.

Referring to Fig. 1 of the drawings, the air conditioner comprises a primary vacuum type absorption refrigeration system 2, an auxiliary cooling system 3 containing a secondary refrigerant for removing heat from the air to be conditioned and transferring it to the primary refrigeration system at a relatively low temperature, and a tertiary cooling system 4 for removing heat from the primary refrigeration system at relatively high temperature.

The primary vacuum type absorption refrigeration system as illustrated in the drawings comprises in general a combined generator and vapor liquid-lift 5, a condenser 6, a combined evaporator and absorber 7 and a liquid heat exchanger 8 interconnected for the circulation of refrigerant and absorbent. The combined generator and vapor liquid-lift 5 is described and claimed in a copending application for United States Letters Patent of Walter M. Simpson Serial No. 219,777 filed April 7, 1951. Suffice it to state herein that the element 5 comprises a single conduit having an upper vapor liquid-lift portion 9 and a depending portion 10 with an extended wall for increasing the heat transfer surface. The vapor liquid-lift 9 and depending portion 10 are enclosed in a jacket 11 providing a heating chamber 12 therebetween. A steam supply conduit 13 is connected to the bottom of the jacket 11 and has an electric motor-operated valve 14 to control the supply of steam to the heating chamber 12. The motorized valve 14 is of a type which opens the valve when energized and closes the valve when de-energized. The valve 14 is so constructed as to supply the required amount of steam to operate the refrigeration system at full capacity and the heat transfer surface of the combined generator and vapor liquid-lift 5 is so proportioned as to condense all of the steam supplied through the conduit 13 when the valve is open. Steam supplied to the heating chamber 12 is maintained at atmospheric pressure by a vent tube 15 at the upper end of the jacket 11. If, for any reason, the steam supplied to the combined generator and vapor liquid-lift 5 is not utilized, steam will escape through the vent pipe 15. A thermostatically operated single pole double throw switch 16 is responsive to the temperature of steam escaping through vent 15 and has control contacts 17 and 18, respectively. The thermostat for operating switch 16 may be of any type and as illustrated comprises a bulb 19 located in a well in the vent pipe 15 and a bellows type motor 20, the bulb and bellows containing a fluid which expands and contracts the bellows in accordance with temperature changes to actuate the switch. A condensate drain pipe 21 is connected to the jacket 11 adjacent the bottom of the heating chamber 12.

A separating chamber 22 surrounds the upper end of the lift conduit 9 and has suitable baffles 23 for separating refrigerant vapor from absorption solution delivered from the lift conduit. A vapor pipe 24 connects the separating chamber 22 to the condenser 6 and a liquid pipe 25 connects the outlet from the condenser to a flash chamber 26. Condenser 6 may be of any known type which hermetically seals the refrigerant from the cooling medium and in the illustrated embodiment comprises a chamber 6a having tubes 6b extending therethrough in which a cooling medium such as water is circulated. The liquid refrigerant pipe 25 is in the form of a U-tube to provide a liquid trap 25a for maintaining a liquid column to balance the difference in pressure between the condenser 6 and combined evaporator and absorber 7. A restricting tube 27 connects the condenser 6 and combined evaporator and absorber 7 to pass noncondensable gases but limit flow of refrigerant vapor.

The flash chamber 26 is in the form of a vessel which receives liquid refrigerant at the high temperature of the condenser and flashes a portion of the refrigerant to cool the remainder to a low temperature corresponding to the boiling point of the refrigerant at the low pressure in the combined evaporator and absorber 7. Such flashing is a violent boiling and is performed prior to the introduction of the refrigerant into the evaporator to prevent violent agitation and splashing in the latter. A vapor pipe 28 connects the flash chamber 26 above the liquid level therein to the top of the combined evaporator and absorber vessel 7 and a liquid pipe 29 connects the bottom of the flash chamber to a liquid distributing means 30 in the evaporator. To prevent the refrigerant, water, from freezing in the flash chamber 26, a low temperature control element is provided in the form of a thermostatically operated single pole double throw switch 31 having control contacts 32 and 33. The thermostat is illustrated diagrammatically in the form of a bulb 34 immersed in a well in the flash chamber 26 and an expansible and contractable bellows 35 connected to operate the switch 31, the bulb and bellows containing a fluid for expanding the latter in accordance with changes in the temperature of the bulb.

The combined evaporator and absorber 7 comprises a closed vessel or shell having an evaporator 36 in one portion and an absorber 37 in another portion. The evaporator 36 is in the form of a serpentine coil or a series of such coils arranged vertically with coil sections 38 located one above the other. Liquid refrigeration is distributed by the liquid distributor 30 onto the top of the uppermost section 38 of the evaporator coil and drips from each section to the next lowermost section from the top to the bottom of the coil. The absorber 37 also comprises a serpentine coil or series of such coils having sections 39 arranged over one over the other and a liquid distributor 40 for delivering absorption solution for gravity flow over the exterior of the coil from each section to the next lowermost section throughout the height of the coil. The evaporator coils 36 are arranged closely adjacent the absorber coils 37 so that refrigerant vapor from the evaporator is absorbed into solution flowing through the absorber.

Absorption solution weak in refrigerant flows by gravity from the separating chamber 22 to the liquid distributing means 40 of the absorber 37 in a path of flow comprising conduit 41, inner passage 42 of the liquid heat exchanger 8, and conduit 43 connected to the liquid distributor 40. Absorption solution strong in refrigerant flows by gravity from the absorber 37 to the base of the combined generator and vapor liquid-lift 5 in a path of flow comprising conduit 44, outer passage 45 of the liquid heat exchanger 8, conduit 46, leveling vessel 47 and conduit 48. Leveling vessel 47 is for the purpose of maintaining a substantially constant liquid level of solution and is connected by a vent pipe 49 to the separating chamber 22. The combined generator and vapor liquid-lift 5 and condenser 6 operate at a pressure corresponding to condensing temperature and the combined evaporator and absorber 7 operates at a lower pressure corresponding to the vapor pressure of the refrigerant in the absorbent. During operation of the refrigeration system liquid columns will stand in U-tube 25 and conduits 43 and 44 to balance the difference in pressure, the liquid standing at some level $x$ in the U-tube 25, at level $y$ in conduit 41 connected to conduit 43 through heat exchanger 8, at level $z$ in conduit 44 and at a level $w$ in leveling vessel 47.

Underlying the evaporator coil 36 is a tray 50 for collecting any unevaporated liquid refrigerant and delivering it to a concentration control vessel 51. The bottom of the concentration vessel 51 is connected to the base of the combined generator and vapor liquid-lift 5 by a conduit 52 and the top of the vessel is connected to the evaporator by a vent pipe 53. Unevaporated liquid refrigerant accumulates in the concentration control vessel 51 to increase the concentration of the absorption solution until an equilibrium is reached at which all of the refrigerant is evaporated in the evaporator, the height of the liquid column and amount of liquid refrigerant stored in the concentration vessel being controlled by the difference in presure between the high and low pressure side of the system.

A secondary refrigerant is circulated in the auxiliary cooling system 3 in heat exchange relation with the evaporator and the air in an enclosure R to be cooled. The auxiliary cooling system comprises the evaporator coils 36 and a heat exchanger coil 54 in the room or rooms R to be cooled. A conduit 55 connects one end of the evaporator coil or coils 36 to one end of the heat exchanger coil 54, a conduit 56 connecting the opposite end of coil 54 to a circulating pump 57, and a conduit 58 connecting the outlet from the pump to the evaporator coil 36 to complete a circuit. Pump 57 is driven by an electric motor 59 for circulating the secondary refrigerant through the evaporator coils 36 and cooling coils 54 successively. A flow responsive control element is connected between the outlet from the pump 57 and the outlet from the evaporator coil 36 of the auxiliary cooling system 3 and comprises a differential pressure arrangement for actuating a single pole single throw switch 60 having a contact 61. The differential pressure arrangement includes a bellows 62 connected to the outlet from the pump 57 by a conduit 63 and a bellows 64 connected to the outlet from the evaporator 36 by a conduit 65, the two bellows being of the same size and connected together and to the switch 60. As illustrated in Fig. 1, the two bellows 62 and 64 are arranged to oppose each other with equal and opposite forces when fluid is supplied to each at the same pressure. Each bellows may be constructed to provide a resistance to expansion which increases proportionately with elongation or suitable load springs may be provided to oppose expansion of the bellows so as to close the switch only when the fluid pressure drop across the evaporator coil 36 exceeds a predetermined value indicating the proper flow of secondary refrigerant. A second control element responsive to the temperature of the secondary refrigerant in the auxiliary cooling system comprises a thermostatic switch 66 having a control contact 67. As illustrated, the thermostat for actuating the switch 66 comprises a bulb 68 in thermal contact with the conduit 55 and a bellows 69 connected to operate the switch, the bulb and bellows containing a fluid which expands and contracts the bellows in accordance with the temperature of the bulb.

The tertiary cooling system 4 for removing heat from the refrigeration apparatus comprises the absorber coil or coils 37 and the tubes 6b of the condenser 6. A cooling medium from any suitable source such as a cooling tower 70 delivers cooling medium through conduit 71 to the bottom of the absorber coils 37 and a conduit 72 connects the top of the absorber coils to a header 73 for the tubes 6b at one end of the condenser 6. A header 74 at the opposite end of the condenser tubes 6b is connected by a conduit 75 to the top of the cooling tower 70 to complete the circuit. A pump 76 at the base of the cooling tower 70 circulates the cooling water through the cooling system and a fan 77 at the top of the tower circulates air in contact with the cooling water flowing therethrough to reduce its temperature by evaporative cooling. A by-pass conduit 78 is connected between the inlet and outlet of the absorber coils 37 to shunt the absorber at the beginning of a period of operation as controlled by a motor operated valve 79. Valve 79 is normally open and operated to closed position as controlled by a switch 80.

A purging device 81 is provided for continuously withdrawing non-condensable gases from the combined evaporator and absorber vessel 7. The purge device 81 is in the form of a vessel connected to the combined evaporator and absorber vessel 7 by a suction tube 82. Absorption solution weak in refrigerant is supplied to the purge vessel 81 from the conduit 43 through a connecting pipe 83 and a fall tube 84 connects the bottom of the vessel to a separating chamber 85. A riser 86 connects the separating vessel 85 adjacent the top thereof to a gas storage vessel 87 and a liquid line 88 connects the separating vessel to the conduit 48 leading to the base of the combined generator and vapor liquid-lift 5.

In accordance with the present invention the various control elements are arranged in interconnected electric control circuits to automatically control the operation of the air conditioner in accordance with requirements while protecting the primary refrigeration system against excessively low temperatures so as to prevent the refrigerant water from freezing. In general, the electric control comprises a thermostatic switch responsive to the temperature of room R for initiating operation of the pump to circulate the secondary refrigerant such as chilled water through the auxiliary cooling system as required. Operation of the refrigeration system, in turn, is controlled by the energization of the circulating pump circuit as acting in conjunction with the other safety control elements to initiate operation only when secondary refrigerant is circulating in the auxiliary cooling system to load the evaporator, the secondary refrigerant is above a predetermined temperature, the flash chamber is above a predetermined temperature and the combined generator and liquid-lift is utilizing all of the heating steam supplied. The control arrangement also includes a timer for controlling the closing of the by-pass in the tertiary cooling system to delay cooling the absorber until refrigerant is supplied to the evaporator of the primary refrigeration system at full capacity.

Referring to Fig. 2 of the drawings, the control circuits are shown connected to a three-phase power line 90. The three-phase power line 90 is connected to the motor 59 of the chilled water pump 57, indicated as CWP in Fig. 2, through a three-phase relay switch 91 and to the cooling tower motors, indicated as CTM in Fig. 2, for pump 76 and fan 77 through a three-phase relay switch 92. It will be understood, however, that the chilled water pump CWP and cooling tower motors CTM may be operated by a single phase power line in accordance with the present invention.

The control for the chilled water pump CWP comprises a thermostatic switch 93 located in room R to be conditioned, see Fig. 1, and affected by the heat exchange coil 54. The thermostatic switch 93 may comprise any suitable temperature responsive actuating means such as the bulb 94 and bellows 95 as illustrated diagrammatically in Fig. 2. The bulb 94 and bellows 95 contain a fluid which expands and contracts the bellows in accordance with the temperature in the enclosure and the bellows is connected to actuate the switch 93. Switch 93 is connected in a low voltage control circuit 96 across the secondary of a step-down transformer which, in turn, is connected across one phase of the three-phase power line 90. Control circuit 96 includes a relay switch 97 connected in a line voltage relay circuit 98 including the three-phase relay switch 91 for the chilled water pump CWP and a relay switch 99 in the control circuit for the refrigeration system.

The control circuit for the refrigeration system comprises a transformer 100 connected across one phase of the three-phase power line 90 to provide a low voltage current on the secondary 101 of the transformer. The vent switch 16, low temperature cut-out switch 31, low temperature secondary refrigerant switch 66, pressure differential switch 60 and relay switch 99 are connected in series to one side of the transformer secondary 101. A conductor 102 from switch 99 is connected to a relay switch 103 and a second conductor 104 is connected in parallel with conductor 102 to a double pole double throw relay switch 105, each branch being completed to a return conductor 106 connected to the opposite side of the transformer secondary 101 to complete a circuit. Relay switch 103 is connected in a relay circuit 107 including the three-phase relay switch 92 for energizing the motors CTM for the cooling tower pump 76 and fan 77. The pole 108 of relay switch 105 is connected in a low voltage relay circuit 109 connected to a transformer across one phase of line 90 for energizing the motor operated steam valve 14.

Conductor 104 is also connected to a contact 110 of a single pole double throw cam-operated switch 111 and to contact 112 of a single pole single throw cam-operated switch 80 for controlling by-pass valve 79. Switch 111 is connected by a conductor 114 to a timing device in the form of an electric clock motor 115 having suitable reduction gearing for driving a cam shaft 116. The circuit through the winding of clock motor 115 is completed to the return conductor 106. Cam 117 on the shaft 116 of motor 115 has a lobe 118 for actuating switch 80 and cam 119 has a lobe 120 for actuating switch 111. Lobes 118 and 120 are relatively short with lobe 118 overlapping lobe 120 at each end so as to close switch 80 before switch 111 opens with contact 110 and close switch 111 with contact 110 before switch 80 is opened. Switch 80 is connected to motor operated valve 79 in the cooling water bypass 78 by a conductor 121 and the opposite side of the valve motor is connected by a conductor 122 to the return conductor 106. Cam 117 has a long dwell so that it turns through nearly a complete revolution and for a period of approximately five minutes after the motor 115 is first initiated before lobe 118 closes switch 80 to actuate valve 79 to closed position. Immediately after the closing of switch 80 with contact 112 to complete a circuit through the motor operated valve 79, switch 111 is operated from engagement with contact 110 into engagement with contact 123 to open the circuit to motor 115 and arrest the rotary movement of the cams 117 and 119, see Fig. 3.

Movement of switch 111 into engagement with contact 123 connects a reset circuit for energization after the completion of a period of operation of the primary refrigeration system. Contact 123 is connected by a conductor 124 to contact 125 for the other pole 126 of the relay switch 105. Pole 126 of switch 105 is connected by a conductor 127 to one side of the transformer secondary 101 and when the circuit for the refrigeration system is opened by any of the control elements 16, 31, 66, 60 or 99, the relay switch 105 will be deenergized and pole 126 will move into engagement with contact 125. Engagement of pole 126 with contact 125 of relay switch 105 will complete the reset circuit through clock motor 115 to rotate cams 117 and 119 to move switch 111 from engagement with contact 123 into engagement with contact 110, to complete a cycle of operation. At the beginning of the next period of operation switch 80 remains closed for a short period of time before it rides off lobe 118.

The vent switch 16 engages contact 18 in the refrigeration control circuit when all of the steam supplied through valve 14 condenses in heating chamber 12 but is moved into engagement with contact 17 when steam escapes from the chamber through vent 15 to open the refrigeration control circuit. Switch 16 and contact 17 are connected in a circuit 128 connected across the secondary 101 of transformer 100 and the circuit includes a double pole single throw relay switch having poles 129 and 129a. Pole 129 is connected in a holding circuit 130 for maintaining the relay circuit energized and having a pushbutton release switch 131. Pole 129a is connected in an annunciator circuit 132 connected in parallel with relay circuit 109 and having a warning element such as a light 133.

Low temperature cut-out switch 31 normally engages contact 32 so long as the flash chamber 26 is above a predetermined low temperature but moves into engagement with contact 33 to open the control circuit for the primary refrigeration system and close a circuit 134 having relay switches 135 and 136 when the flash chamber falls below said predetermined low temperature. Relay switch contacts 135 and 135a open the primary refrigeration control circuit and close a holding circuit 137 having a push button release switch 138, respectively, and relay switch 136 closes an annunciator circuit 139 including a warning element such as a light 140. One form of the invention having now been described in detail, the mode of operation is explained as follows.

For purposes of description let it be assumed that the air in the room or enclosure R is at a sufficiently low temperature, the entire air conditioner is idle and that the temperature outside of the enclosure is sufficiently high to cause heat leakage thereto. The temperature of the enclosure R will gradually increase until the thermostatic switch 93 closes indicating that refrigeration is required. Closing of thermostatic switch 93 energizes the control circuit from the transformer secondary 96 and closes the relay switch 97 in the line voltage relay circuit 98. Energization of the relay circuit 98 closes relay switch 97 to energize motor 59 for the circulating pump 57 and close the relay switch 99 of the refrigeration control circuit.

Pump 57 will then be energized to circulate secondary refrigerant through the auxiliary cooling system in heat exchange relation with the evaporator 36 and ambient air in the room or enclosure R. The path of flow for the secondary refrigerant in the auxiliary cooling circuit from the pump 57 comprises the conduit 58, coils of evaporator 36, conduit 55, heat exchanger coil 54, and conduit 56 back to the pump. The relatively cold secondary refrigerant or chilled water circulating in the auxiliary cooling system will then receive heat from the relatively warm air in the enclosure or room R and transfer it to the evaporator 36 of the primary absorption refrigeration system to cool the room.

When the secondary refrigerant is above or increases to a safe operating temperature to load the evaporator 36, the switch 66 closes to initiate operation of the primary absorption refrigeration system. It will be noted, however, that the control circuit for the refrigeration system will not be energized unless the plurality of safety switches including the vent switch 16, low temperature cut-out switch 31, differential pressure switch 60 and relay switch 99 are also closed. For example, if the temperature of the secondary refrigerant increases sufficiently to close switch 66 but the temperature in the enclosure R is satisfactory the relay switch 99 will remain open and prevent operation of the primary refrigeration system. If the thermostatic control switch 93 is closed and the circulating pump 57 is operating but there is insufficient pressure drop across the evaporator coils 36 to close switch 60 due to improper operation of the pump 57 or lack of secondary refrigerant in the auxiliary cooling circuit, switch 60 in the refrigeration control circuit will remain open to prevent operation of the system. However, with the various control switches closed the closing of switch 66 will actuate the relay switches 103 and 105 to the closed position illustrated in Fig. 2. Closing of relay switch 103 energizes the relay circuit 107 to close relay switch 92 and initiate operation of the motors CTM for the cooling tower pump 76 and fan 77. Cooling medium will then be circulated through the tertiary cooling system from the base of the cooling tower 70 through conduit 71, by-pass 78, conduit 72, header 73, tubes 6b of condenser 6, header 74 and conduit 75 back to the top of the cooling tower to cool the condenser. Closing of relay switch 105 energizes relay circuit 109 to energize the motor operated valve 14 to supply steam to the heating chamber 12 of the combined generator and vapor liquid-lift 5 to initiate operation of the primary refrigeration system.

Simultaneously, a circuit to energize the electric clock motor 115 is completed through conductor 104, contact 110, switch 111, and conductor 114. Upon energization of the electric clock motor 115 the cam shaft 116 is rotated for a period required for the primary refrigeration system to supply refrigerant from the generator 5 to the evaporator 36 at full capacity. With a vacuum type absorption refrigeration system of the type described of twenty tons ice melting capacity, it has been found that five minutes after steam has been supplied to the heating chamber 12 is sufficient to prevent freezing before the evaporator 36 is fully loaded. At the end of the time delay required the cam 117 closes switch 80 to energize the circuit for the by-pass valve 79 from conductor 104 through conductors 121 and 122. Energization of the circuit operates valve 79 to close by-pass 78 and cause the tertiary cooling medium to flow through the coils of absorber 37 and condenser 6 successively. Immediately after the closing of switch 80 the switch 111 is moved by lobe 120 of cam 119 from engagement with contact 110 into engagement with contact 123 connected to open contact 125 by conductor 124 to arrest operation of clock motor 115.

When steam is supplied to the heating chamber 12 of the primary refrigeration system refrigerant vapor is expelled from absorption solution and lifts solution by vapor lift action in the combined generator and lift conduit 5. Refrigerant vapor flows from the separating chamber 22 through conduit 24 to condenser 6 where it is condensed to a liquid and solution weak in refrigerant flows from the separating chamber 22 to the liquid distributor 40 in the absorber 37 in a path of flow comprising the conduit 41, inner passage 42 of the liquid heat exchanger 8 and conduit 43, and the absorption solution drips from each coil section 39 to the next lowermost coil section from the top to the bottom of the absorber. The liquefied refrigerant flows from condenser 6 through the U-tube 25 to the flash chamber 26 and from the flash chamber through conduit 29 to the liquid distributor 30 where it drips from each coil section 38 onto the next lowermost section from the top to the bottom of the evaporator coils. Due to the high affinity of absorption solution for refrigerant vapor the refrigerant evaporates at low pressure and temperature to produce refrigeration on the exterior of the coils of the evaporator 36. Thus, heat abstracted from the room R by the secondary refrigerant is transferred to the refrigerant in the primary absorption refrigeration system. Absorption solution rich in refrigerant then flows from the absorber 37 back to the base of the generator 5 in a path of flow including the conduit 44, outer passage 45 of the liquid heat exchanger 8, conduit 46, leveling vessel 47 and conduit 48 to complete a cycle of operation.

At the beginning of a period of operation of the refrigeration system, the immediate supply of absorption solution weak in refrigerant to the absorber 37 and the delay in the supply of refrigerant to the evaporator 36 tends to reduce the vapor pressure of the refrigerant. Such a condition tends to reduce the temperature of the refrigerant supplied before full capacity is attained below its freezing point. To avoid such freezing before full capacity is reached, the cooling medium in the tertiary cooling system is bypassed through conduit 78 to shunt the absorber coils 37. After the time period required to supply refrigerant at full capacity has elapsed, bypass valve 79 is closed as previously explained, to cause cooling medium in the tertiary cooling system to flow through the coils of the absorber 37 and tubes 6b of the condenser 6 successively to remove the heat of absorption and decrease the pressure and temperature of the shell of the combined evaporator and absorber 7.

The primary absorption refrigeration system then continues to operate in the manner described until the air in the enclosure R is reduced to the desired temperature which opens control switch 93. De-energization of relay switch 97 opens relay circuit 98 which, in turn, opens switch 91 to stop the circulating pump 57 and opens relay switch 99 in the control circuit for the primary refrigeration system. Upon opening of relay switch 99 the relay switches 103 and 105 are opened to arrest operation of the cooling tower 70 and close steam valve 14, respectively. Upon de-energization of relay switch 105 a circuit is completed from the transformer secondary 101 through conductor 127, pole 126, contact 125 of switch 105, conductor 124, contact 123, switch 111 and conductor 114 to again energize the clock motor 115. Rotation of the cam shaft 116 from the position illustrated in Fig. 3 to that illustrated in Fig. 2 moves switch 111 from contact 123 into engagement with contact 110 to arrest operation of clock motor 115 and re-sets the control for the next cycle of operation.

At any time during a cycle of operation of the primary absorption refrigeration system if steam escapes through the vent conduit 15, switch 16 will open the control circuit for the primary refrigeration system; if the temperature of the flash chamber 26 becomes too low, switch 31 will open the circuit; if the temperature of the secondary refrigerant becomes too low, switch 66 will open the circuit; or if the secondary refrigerant fails to circulate properly in the auxiliary cooling system, switch 60 will open the circuit. Closing of vent switch 16 with contact 17 will close circuit 128 to energize annunciator circuit 132 and holding circuit 130 will maintain the annunciator circuit energized until push button switch 131 is manually opened. Closing of low temperature cut out switch 31 with contact 33 closes circuit 134 to open switch 135, energize annunciator circuit 139 and close holding circuit 137 to maintain the annunciator circuit energized until push button switch 138 is opened manually. Thus, the control of the present invention automatically regulates the operation of the air conditioner while protecting the absorption refrigeration system from low temperatures which might cause freezing of the refrigerant therein.

It will now be observed that the present invention provides a control for an air conditioner in which the operation of the primary refrigeration system is prevented until secondary refrigerant is being circulated in the auxiliary cooling system. It will also be observed that the present invention provides a control arrangement which delays the cooling of the absorber until refrigerant is being supplied at full capacity. It will still further be observed that the present invention provides a control which prevents operation of the refrigeration system and gives warning if the refrigeration system does not utilize all of the heating steam supplied or if the temperature of the evaporator decreases below a predetermined value.

While a single form of the invention is herein illustrated and described, it will be understood that modifications may be made in the construction and arrangement of the elements without departing from the spirit or scope of the invention. Therefore, without limitation in this respect, the invention is defined by the following claims.

We claim:

1. In an air conditioner, a vacuum type absorption refrigeration system utilizing water as a refrigerant and having an evaporator and absorber, an auxiliary cooling system for circulating a cooling medium in heat exchange with the evaporator and ambient to be cooled, a second auxiliary cooling system for flowing a cooling medium in heat exchange with the absorber, and control means for delaying operation of the refrigeration system until the evaporator is externally loaded by the flow of cooling medium in heat exchange therewith and delaying the operation of the second auxiliary cooling system to flow cooling medium in heat exchange with the absorber until the evaporator is internally loaded with refrigerant to prevent the refrigerant from freezing.

2. In an air conditioner, a vacuum type absorption refrigeration system utilizing water as a refrigerant and having an evaporator and absorber, an auxiliary cooling system for circulating a cooling medium in heat exchange with the evaporator and ambient to be cooled, a second auxiliary cooling system for circulating a cooling medium in heat exchange with the absorber and having a by-pass for shunting the absorber with valve means for closing the by-pass, and control means having a device responsive to the flow of cooling medium in the first auxiliary cooling system to delay operation of the refrigeration system until the evaporator is externally loaded, and a timing device in the control means connected to actuate the valve means to close the by-pass after a predetermined period of time to delay cooling the absorber until the evaporator is internally loaded with refrigerant.

3. In an air conditioner, a primary refrigeration system having an evaporator, an auxiliary cooling system having parts in heat exchange relation with the evaporator and ambient to be cooled, a pump for circulating a cooling medium through the auxiliary cooling system, control means responsive to the ambient temperature affected by the auxiliary cooling system for initiating operation of the pump, control means responsive to the temperature of the cooling medium in the auxiliary system for controlling operation of the refrigeration system, and a controller responsive to the operation of the pump and connected to the control means for the primary refrigeration system to delay operation of the latter until a load is applied to the evaporator.

4. In an air conditioner, a vacuum type absorption refrigeration system having an evaporator and utilizing water as a refrigerant, an auxiliary cooling system having parts in heat exchange relation with the evaporator and ambient to be cooled, a pump for circulating a secondary refrigerant through the auxiliary cooling system, control means responsive to the ambient temperature affected by the auxiliary cooling system for initiating operation of the pump, control means responsive to the temperature of the secondary refrigerant for controlling operation of the refrigeration system, and a controller responsive to the flow of secondary refrigerant in the auxiliary cooling system and connected in the control means for the absorption refrigeration system to delay operation of the latter until secondary refrigerant is circulating to load the evaporator.

5. In an air conditioner, a vacuum type absorption refrigeration system having an evaporator and utilizing water as a refrigerant and a salt solution as an absorbent, an auxiliary cooling system having parts in heat exchange relation with the evaporator and ambient to be cooled, a pump for circulating a secondary refrigerant through the auxiliary cooling system, an electric control circuit having a thermostatic switch responsive to the ambient temperature affected by the auxiliary cooling system for initiating operation of the pump, an electric control circuit having a switch closed by the energization of the pump control circuit for controlling operation of the refrigeration system, and a switch in the control circuit for the absorption refrigeration system and responsive to the flow of secondary refrigerant in the auxiliary cooling system to delay operation of the absorption refrigeration system until secondary refrigerant is circulating to load the evaporator.

6. In an air conditioner, a primary refrigeration system having an evaporator, an auxiliary cooling system having parts in heat exchange relation with the evaporator and ambient to be cooled, a pump for circulating a secondary refrigerant in the auxiliary cooling system, a thermostatic switch responsive to an ambient temperature affected by the auxiliary cooling system, an electric control circuit energized by the closing of the thermostatic switch to initiate operation of the pump, an electric control circuit for the refrigeration system having a relay switch, and said pump and refrigeration circuits being interconnected to close the relay switch in the refrigeration control circuit upon energization of the pump control circuit and open the relay switch upon de-energization of the pump control circuit to permit operation of the refrigeration system only when cooling medium is circulated in the auxiliary cooling system.

7. In an air conditioner, a primary refrigeration system having an evaporator, an auxiliary cooling system having parts in heat exchange relation with the evaporator and ambient to be cooled, a pump for circulating a secondary refrigerant in the auxiliary cooling system, a thermostatic switch responsive to a temperature affected by the auxiliary cooling system, an electric control circuit for operating the pump upon closing the thermostatic switch, an electric control circuit for the refrigeration system having a relay switch, said pump and refrigeration control circuits being interconnected to close the relay switch upon energization of the pump circuit, a second control switch in the refrigeration circuit in series with the first-mentioned relay switch, and a device responsive to a difference in pressure of the secondary refrigerant in the auxiliary cooling system to delay operation of the refrigeration system until the pump is operating and cooling medium is circulating in the auxiliary cooling system.

8. In an air conditioner, a primary refrigeration system having an evaporator, an auxiliary cooling system having parts in heat exchange relation with the evaporator and the ambient to be cooled, a pump for circulating a secondary refrigerant in the auxiliary cooling system, an electric control circuit having a switch actuated in response to the temperature of the ambient to be cooled for initiating operation of the pump, an electric control circuit for the refrigeration system having a first control switch responsive to the temperature of the cooling medium in the auxiliary cooling system, a second control switch responsive to the energization of the control circuit for the pump, and a third control switch responsive to a difference in pressure in the cooling medium in the auxiliary cooling system, said three control switches being arranged in series to delay operation of the refrigeration system until there is need for primary cooling and secondary refrigerant is circulating in the auxiliary system to load the evaporator.

9. In an air conditioner, an absorption refrigeration system having an absorber, a cooling system having a part in heat exchange relation with the absorber and a by-pass for shunting the absorber with means for closing the by-pass, means for circulating a cooling medium in the cooling system, control means for initiating operation of the refrigeration system and circulating means, and a timing device initiated by operaton of the control means to start the refrigeration system and connected to actuate the means to close the by-pass after a predetermined period of time.

10. In an air conditioner, an absorption refrigeration system having an evaporator and absorber, an auxiliary cooling system having parts in heat exchange relation with the evaporator and ambient to be cooled, a second auxiliary cooling system having a part in heat exchange relation with the absorber and a by-pass for shunting the absorber, valve means for closing the by-pass, pumps for circulating cooling medium in the respective systems, a control responsive to a temperature affected by the first auxiliary cooling system for actuating the pump in said system, a control responsive to the operation of said pump in the auxiliary cooling system for initiating operation of the refrigeration system and pump in the second auxiliary cooling system, and a control having a timer initiated by the last-mentioned control means and connected to actuate the valve means to close the by-pass after the elapse of a predetermined period of time.

11. An absorption refrigeration apparatus having a plurality of elements interconnected to provide circuits for the circulation of refrigerant and absorbent, a cooling system for directing a cooling medium in thermal contact with a plurality of the elements successively to extract heat from the apparatus, a by-pass conduit in the cooling system for shunting one of the elements at the beginning of a period of operation, valve means for closing the by-pass conduit, control means for initiating operation of the apparatus, and a timing element in the control means and operable after a predetermined period of operation of the refrigeration apparatus to actuate the valve means to close the by-pass conduit.

12. An absorption refrigeration apparatus having a plurality of elements including an absorber interconnected to provide circuits for the circulation of refrigerant and absorbent, a cooling system for circulating a cooling medium in heat exchange relation with the absorber to remove heat therefrom, said cooling system having a by-pass conduit for shunting the absorber, means to close the by-pass, control means for initiating operation of the apparatus, and a timing device initiated by the control means simultaneously with the initiation of the refrigeration apparatus and connected to actuate the means to close the by-pass after a predetermined period of operation of the apparatus.

13. An absorption refrigeration apparatus having a generator, a condenser, an evaporator and an absorber with conduits interconnecting the elements to provide circuits for the circulation of refrigerant and absorbent, a cooling system for circulating a cooling medium in heat exchange relation with the absorber and condenser successively to remove heat from the apparatus, a by-pass conduit in the cooling system for shunting the absorber at the beginning of a period of operation, a valve for closing the by-pass conduit, an electric control means for initiating operation of the apparatus when energized, and an electric clock initiated upon energization of the electric control circuit and having control means connected to actuate the valve to close the by-pass conduit after a predetermined period of operation of the apparatus.

14. An absorption refrigeration apparatus having a generator, a condenser, an evaporator and an absorber with conduits interconnecting the elements to provide circuits for the circulation of refrigerant and absorbent, means for heating the generator to circulate refrigerant and absorbent, a cooling system having parts in heat exchange relation with the absorber and condenser, means for circulating a cooling medium in the cooling system to remove heat from the apparatus, said cooling system having a by-pass conduit for shunting the absorber, a valve for closing the by-pass conduit, control means for simultaneously actuating the heating means and circulating means, and a clock-operated timing device in the control means connected to actuate the valve and close the by-pass a predetermined period of time after the heating means has been actuated.

15. An absorption refrigeration apparatus having a plurality of elements including an absorber interconnected for the circulation of refrigerant and absorbent, a cooling system having a part in heat exchange relation with the absorber and a by-pass for shunting the absorber, an electric control circuit for initiating operation of the refrigeration apparatus when energized, a clock motor in the electric control circuit, a control switch operated by the clock motor after a predetermined period of time and connected to energize the valve means to close the by-pass, a second control switch operated by the clock motor to open the control circuit to the latter to arrest its operation, and a reset circuit including the last-mentioned control switch and a relay switch in the control circuit for the refrigeration apparatus to reset the clock motor control switches to their initial position when the control circuit is de-energized.

HARRY C. SHAGALOFF.
PHILIP A. COOPER.

References Cited in the file of this patent

UNITED STATES PATENTS

| Number | Name | Date |
|---|---|---|
| 2,056,970 | Leopold | Oct. 13, 1936 |
| 2,177,602 | Spaan | Oct. 24, 1939 |
| 2,378,177 | Bichowsky | June 12, 1945 |